United States Patent
Horain et al.

(10) Patent No.: US 8,885,246 B2
(45) Date of Patent: Nov. 11, 2014

(54) DEVICE FOR EXTENDING THE SERVICE LIFE OF A NON-LINEAR OPTICAL SYSTEM SUBJECTED TO THE RADIATION OF AN INTENSE LASER BEAM AND NON-LINEAR OPTICAL SOURCE INCLUDING SAID DEVICE

(75) Inventors: David Horain, Bordeaux (FR); Louis Mcdonagh, Bordeaux (FR); Julien Saby, Bordeaux (FR); Francois Salin, Gradigan (FR); Philippe Metivier, Talence (FR)

(73) Assignee: Eolite Systems, Pessac (FR)

( * ) Notice: Subject to any disclaimer, the term of this patent is extended or adjusted under 35 U.S.C. 154(b) by 682 days.

(21) Appl. No.: 13/130,307

(22) PCT Filed: Nov. 20, 2009

(86) PCT No.: PCT/FR2009/052234
§ 371 (c)(1),
(2), (4) Date: May 20, 2011

(87) PCT Pub. No.: WO2010/058136
PCT Pub. Date: May 27, 2010

(65) Prior Publication Data
US 2011/0222565 A1    Sep. 15, 2011

(30) Foreign Application Priority Data
Nov. 21, 2008 (FR) ..................... 08 57915

(51) Int. Cl.
*G02F 1/35* (2006.01)
*H01S 3/10* (2006.01)
*G02B 26/08* (2006.01)
*G02F 1/37* (2006.01)

(52) U.S. Cl.
CPC ............... *G02F 1/3525* (2013.01); *G02F 1/37* (2013.01); *G02B 26/0875* (2013.01)

USPC ................ 359/326; 359/328; 372/22; 372/24

(58) Field of Classification Search
USPC .................................. 359/326–329
See application file for complete search history.

(56) References Cited

U.S. PATENT DOCUMENTS

| 5,179,562 A | 1/1993 | Marason et al. |
| 5,500,865 A * | 3/1996 | Chakmakjian et al. ......... 372/22 |

(Continued)

FOREIGN PATENT DOCUMENTS

| JP | 63-165825 | 9/1988 |
| JP | 04-257283 | 9/1992 |

(Continued)

OTHER PUBLICATIONS

International Search Report, dated Mar. 16, 2010, from corresponding PCT application.
Office Action Mailed Nov. 5, 2013 in Japanese counterpart Application No. JP 2011-536931, English Translation, 11 pages.

*Primary Examiner* — Hemang Sanghavi
(74) *Attorney, Agent, or Firm* — Haynes Beffel & Wolfeld LLP

(57) ABSTRACT

A device for extending the lifetime of a frequency-converting non-linear optical system (19) subjected to the radiation of an intense laser beam includes two plates (2, 3) with flat and parallel surfaces angled on the beam and elements for transverse rotation of the plates (2, 3) suitable for changing the angle of inclination of the first plate in an angular range $(i_2^0 \pm \delta i_2)$ to move the incident beam relative to the optical system (19), while minimizing the amplitude of movement of the output beam (37, 47) on the angular inclination range $(i_2^0 \pm \delta i_2)$ of the first plate. The application of the device in a non-linear optical source including one or more non-linear crystals (1, 16) is also described.

17 Claims, 6 Drawing Sheets

(56) References Cited

U.S. PATENT DOCUMENTS

| | | | |
|---|---|---|---|
| 5,646,764 A | 7/1997 | Moore et al. | |
| 5,825,562 A | 10/1998 | Lai et al. | |
| 6,859,225 B1 | 2/2005 | Silverbrook et al. | |
| 2002/0175149 A1 | 11/2002 | Gruber et al. | |
| 2003/0147433 A1 | 8/2003 | Kafka et al. | |
| 2005/0254532 A1* | 11/2005 | Van Saarloos | 372/24 |
| 2012/0120481 A1* | 5/2012 | Armstrong | 359/328 |
| 2012/0281722 A1* | 11/2012 | Boggy | 372/20 |

FOREIGN PATENT DOCUMENTS

| | | |
|---|---|---|
| JP | 05-042382 | 2/1993 |
| JP | 7-036072 | 2/1995 |
| JP | 2000-261076 | 9/2000 |
| WO | 00/77890 A2 | 12/2000 |
| WO | 03/102665 A1 | 12/2003 |

\* cited by examiner

DEVICE FOR EXTENDING THE SERVICE LIFE OF A NON-LINEAR OPTICAL SYSTEM SUBJECTED TO THE RADIATION OF AN INTENSE LASER BEAM AND NON-LINEAR OPTICAL SOURCE INCLUDING SAID DEVICE

The present invention relates to a device for extending the lifetime of one or more linear or non-linear optical components subjected to the radiation of an intense laser beam. The invention finds applications in particular in optical frequency converters, and notably the optical harmonic generators comprising a non-linear crystal, such crystal being subjected to a potentially destructive radiation, such as intense and focused UV radiations. The invention also applies to frequency-tunable optical parametric oscillator (OPO) laser sources.

The solid lasers are known to produce beams of excellent optical quality and are used in many applications, including micro-machining of semi-conductor, marking of plastics, etching of solar cells . . . . For a great part of these applications, it is necessary to convert the generally infrared radiation emitted by the laser into a radiation at higher frequencies. There is a quite particular interest in producing the second, third, fourth, or even fifth, harmonics of the fundamental frequency so as to obtain continuous or pulsed beams of high power and high quality in the UV.

The pulsed solid lasers can produce average powers exceeding one hundred of watts over pulses of relatively short duration (shorter than 200 ns). It may be mentioned laser mediums, such as the Nd:YVO4, the Nd:YAG, the Nd:YLF, as well as the Nd- or Yb-doped glass fibers, as a laser pulse source capable of operating at very high frequency (typically 10 to 500 kHz). The production of the third harmonic is now commercial, and powers of the order of 20 W have been obtained at 355 nm, of 4 W at 266 nm, and an increasing interest appears for still shorter wavelengths.

The major difficulty appearing when it is desired to produce the harmonics of a high-frequency pulsed laser lies in the lifetime of the optical components subjected to high powers in the UV. It is known that subjecting a component comprising an optical treatment or a non-linear crystal during a long period of time to a strong UV radiation translates into an irreversible degradation of the component in an area close to the illuminated area. The physical reason of this degradation is still an object of study and is not well understood. Means for extending the lifetime of an area exist, but they do not always permit to reach the lifetimes required by the industrial applications of these sources. The damages are known to accelerate with the incident power density and for the short wavelengths, and can be induced by imperfections on the surface of the optical elements.

The effects observed are cumulative and translate into a progressive degradation of the quality of the beam produced and of the power in the UV.

In order to produce a UV radiation, the conventional method consists in focusing an intense beam in a non-linear crystal. The typical crystals are the LBO, BBO and CLBO, but any other crystal could work. In the case of the lasers operating at high frequency, the low energy per pulse forces to focus the beam to diameters of the order of 100 µm. The power density then reaches several tens of kW per cm$^2$ and ends up inducing redhibitory defects.

A known method for limiting the degradation of the crystals consists in displacing the non-linear crystal in a plane transverse to the axis of the laser beam after a duration going from a few hours to a few weeks, so as to find a new area of the crystal that has not yet undergone damages. The size of the beam being of the order of 100 micrometres and that of the crystal of typically 3×3 mm, it is easy to decompose the surface of the crystal into more than one hundred of elementary areas that will be illuminated by the beam one after the other during these displacements. If it is considered that the beam can stay 100 h on an area without losing more than 10% of its power, for example, the lifetime of the crystal is increase by a factor 100 to reach about 10,000 h. When all the areas have been progressively used, the crystal has to be changed. Such a method is described in the U.S. Pat. No. 5,179,562 of Marason for the case of the continuous lasers and in the U.S. Pat. No. 5,825,562 (Lai et al.) for the specific case of the pulsed lasers. The U.S. Pat. No. 5,825,562 describes a translation system comprising two translation plates mounted perpendicular to each other and perpendicular to the laser beam. Other patents disclose improvements of the translation or displacement system according to a circular path of the crystal in a plane perpendicular to the beam (patent application US2003/0147433 "Extended lifetime harmonic generator" Kafka et al.; U.S. Pat. No. 6,859,225 "Method of programmed displacement for prolonged usage of optical element under the irradiation of intense laser beam"). These methods are used in all the solid lasers emitting in the UV by generation of the 3$^{rd}$ or the 4$^{th}$ harmonic that are commercially available.

These methods have the major drawback that they require a prefect translation without any rotation of the crystal around an axis perpendicular to the beam axis. Indeed, the generation of harmonic in a non-linear crystal is based on a phase matching. The latter is obtained by very finely adjusting the angle between the crystal axis and the laser beam. If this angle varies during the translation, the conversion efficiency will change and the power produced in the harmonic radiation will vary. The typical accuracy for a LBO crystal of 15 mm long is very lower than 1 milliradian. It may be still lower for very birefringent crystals such as the BBO or for very short wavelengths. It is therefore necessary to ensure that the translation of the crystal over several millimetres in the two directions perpendicular to the laser beam axis will not induce a rotation of more than a few microradians. Such an accuracy is very difficult to maintain over displacements of several millimetres and during periods of several years. Moreover, the presence of moveable elements makes it impossible to fasten firmly the crystal, the orientation of which can thus change during transport events. It is thus necessary to readjust the phase matching at each translation of the crystal. This matching readjustment is generally performed by changing the temperature of the crystal, but it requires a complicated control loop.

Moreover, according to the methods of displacement of the optical component, when a laser comprises several solid optical components arranged in series on the optical path of the laser and subjected to an intense laser beam, each component has to be equipped with a translation system to modify the area of illumination by the beam on each component, which makes the device even more complicated. This is in particular the case in the triple, quadruple or quintuple harmonic generators, which use a cascade of non-linear crystals. As used hereinafter, "non-linear optical system" means a set of optical components comprising at least one non-linear optical component, which may be a non-linear crystal. When the optical system comprises several components, these latter are arranged in series in the optical path.

Besides, the U.S. Pat. No. 5,546,764 describes a device for continuously rotating the beam of a laser following a circular path on the surface of a crystal, so as to avoid the local heating of the crystal. The device comprises two identical plates with flat and parallel surfaces, the two plates being arranged on either side of an optical-frequency-conversion non-linear crystal. The two plates are symmetrically inclined by a fixed angle with respect to the laser beam axis, and being continuously rotated around the beam axis. This device makes it possible to move quickly (several hertz) the point of impact of the beam following a circle, the crystal staying fixed. The rotations of the two plates have to be identical and synchronized so that an output beam of fixed direction can be maintained in first approximation. However, such rotation coupling of two optical elements that are separated (by the presence of one or more crystals) may be difficult to realize. Moreover, the cylindrical path of the beam does not permit to exploit all the surface of the crystal, and does not permit to extend a lot the lifetime of the crystal. Finally, the compensation for the deflection of the first plate by the deflection of the second plate is generally imperfect, so that the output beam performs a residual circular or spiral movement. This residual movement of the output beam is due, in particular, to the wavelength difference between the beams passing through the first and the second plate and to the chromatism of the plates. This parasitic movement is all the more hampering that the size of the beam is small. According to the document U.S. Pat. No. 5,646,764, the difference of deflection of the two plates is of several tens of micrometres, which does not permit to maintain constant output beam direction and position for a beam of small size.

More particularly, in the laser micro-machining applications, the size of the UV laser beam is of the order of 100 micrometres. This UV laser beam is generally coupled to optics to be precisely focused. The beam direction and position have to be kept stable, within a few percents, i.e. within a few micrometres.

The present invention aims to remedy these drawbacks and relates more particularly to a device for extending the lifetime of a least one frequency-converting non-linear optical system subjected to the radiation of an intense laser beam, the optical system being capable of converting an incident beam of fundamental optical frequency $\omega_1$ into an output beam of optical frequency $\omega_2$. According to the invention, the device comprises a first transmission plate with flat and parallel surfaces, of thickness $e_2$ and of index $n_2(\omega 1)$, capable of being inserted in the optical path of said incident laser beam and of transmitting a beam, the normal $\eta_2$ to a flat surface of said first plate forming an angle of inclination ($i_2$) with the axis of propagation X of the laser beam. The device comprises a second transmission plate with flat and parallel surfaces, of thickness $e_3$ and of index $n_3(\omega_2)$, capable of being inserted in the optical path of the beam at the exit of said optical system and of transmitting a beam of optical frequency $\omega_2$, the normal $\eta_3$ to said second plate forming an angle of inclination ($i_3$) with respect to the axis of propagation X' of the beam. The device of the invention further comprises a means for transverse rotation of said first plate around at least one axis (Y, Z) transverse to the axis of propagation (X) of the laser beam, capable of modifying the inclination ($i_2$) over an angular range ($i_2^0 \pm \delta i_2$) to displace the beam with respect to the optical system, and a means for transverse rotation of said second plate around at least one axis (Y', Z') transverse to the axis of propagation (X') of the beam, capable of modifying the inclination ($i_3$) over an angular range ($i_3^0 \pm \delta i_3$). According to the invention, the two plates and the means for transverse rotation of the two plates are capable of minimizing the amplitude of the output beam displacement, in terms of position and angular direction, over the range of angular inclination ($i_2^0 \pm \delta i_2$) of the first plate.

According to a particular embodiment, the device comprises means for mechanically coupling the two plates capable of making the inclination ($i_2$) of the first plate and the inclination ($i_3$) of the second plate interdependent with each other over the angular range ($i_2^0 \pm \delta i_2$), and the thickness $e_3$ of the $2^{nd}$ plate is capable of minimizing the amplitude of the residual displacement of the output beam as a function of the thickness $e_2$ of the $1^{st}$ plate, of the optical indices $n_2(\omega_1)$ and $n_3(\omega_2)$ and of the angular range ($i_2^0 \pm \delta i_2$).

According to a particular embodiment of the invention, the means for coupling the two plates comprise a mechanical drive means capable of causing the simultaneous inclination of the two plates with respective angles of inclination $i_2$ and $i_3$ opposite to each other.

According to a preferred embodiment of the invention, the means for coupling the two plates comprise a mechanical drive means capable of causing the simultaneous inclination of the two plates with respective angles of inclination $i_2$ and $i_3$ equal to each other.

Advantageously, the rotation means is common to the two plates and is capable of modifying the inclination of the two plates by an identical angle, and the incident beam and the output beam propagate in a plane between the two plates, and the output beam undergoes an odd number of reflections between the plates.

Advantageously, the diameter of the incident beam to the optical system is lower than the amplitude of beam displacement induced by the inclination of the first plate over the range of angular inclination ($i_2^0 \pm \delta i_2$).

According to another particular embodiment, the two plates are identical and the device comprises means capable of calculating and applying an angle of inclination ($i_3$) as a function of the thickness of the plates, of the optical indices $n_2(\omega_1)$ and $n_3(\omega_2)$ thereof, and of the angle of inclination ($i_2$), so as to compensate for the displacement of the output beam for each angle of inclination of the $1^{st}$ plate over the angular range ($i_2^0 \pm \delta i_2$).

Advantageously, the device of the invention comprises an optical system with a magnifying power G, placed between the two plates, and the angle of inclination ($i_3$), the thickness ($e_3$) and the index ($n_3$) of the $2^{nd}$ plate are determined as a function of the magnifying power G of said optical system, so as to compensate for the displacement of the output beam for each inclination ($i_2$) over the angular range ($i_2^0 \pm \delta i_2$).

The invention also relates to a non-linear optical source comprising a non-linear optical system and a device for extending the lifetime of said non-linear optical system according to one of the preceding embodiments, whose plates are arranged on either side of said non-linear optical system.

According to a particular embodiment, the non-linear optical source of the invention comprises a non-linear optical system comprising two non-linear crystals located between the two plates of the device for extending the lifetime of said crystals, the first non-linear crystal being capable of doubling the frequency of the incident fundamental wave and the second non-linear crystal being capable of generating the $3^{rd}$ harmonic by summing the frequencies of the fundamental wave and the second harmonic thereof.

According to another embodiment, the non-linear optical source of the invention comprises a non-linear optical system comprising two non-linear crystals located between the two plates, the first non-linear crystal being capable of doubling the frequency of the incident fundamental wave and the second non-linear crystal being capable of generating the $4^{th}$ harmonic by doubling the frequency of the second harmonic.

According to still another embodiment, the non-linear optical source of the invention comprises a non-linear optical system comprising three non-linear crystals located between the two plates, the first non-linear crystal being capable of doubling the frequency of the incident fundamental wave, the second non-linear crystal being capable of generating the $3^{rd}$ harmonic by mixing the frequencies of the second harmonic and the fundamental wave, and the third non-linear crystal being capable of generating the $5^{th}$ harmonic by mixing the frequencies of the second harmonic and the third harmonic produced by the first and second crystals.

The invention also relates to a non-linear optical source comprising at least one crystal located between the two plates, capable of producing a coherent radiation by optical parametric generation.

The invention also relates to a non-linear optical source comprising a means for measuring the transmitted power of the beam after frequency conversion and a drive system capable of causing the transverse rotation of the plates when the transmitted power decreases by a predefined value.

The invention also relates to a non-linear optical source comprising a device for extending the lifetime of a non-linear optical system placed inside a laser cavity.

The present invention also relates to the characteristics that will become evident from the following description and that will have to be considered either alone or in any technically possible combination thereof.

The present description is given only by way of non-limitative example and will permit to better understand how the invention can be implemented with reference to the appended drawings, in which.

Figure 3:
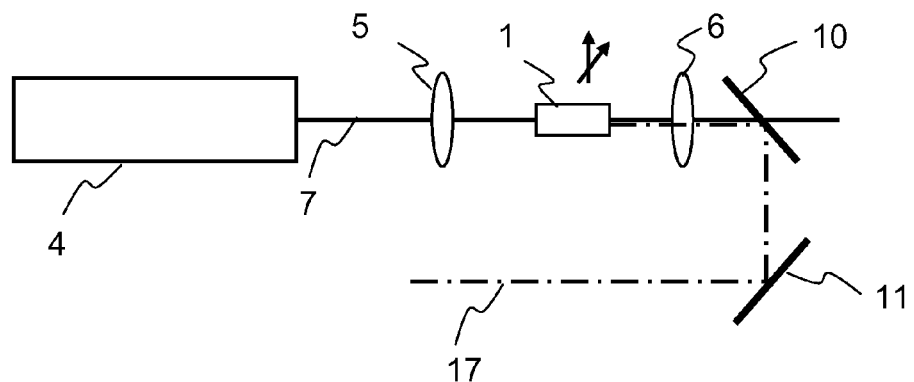
Figure 4:
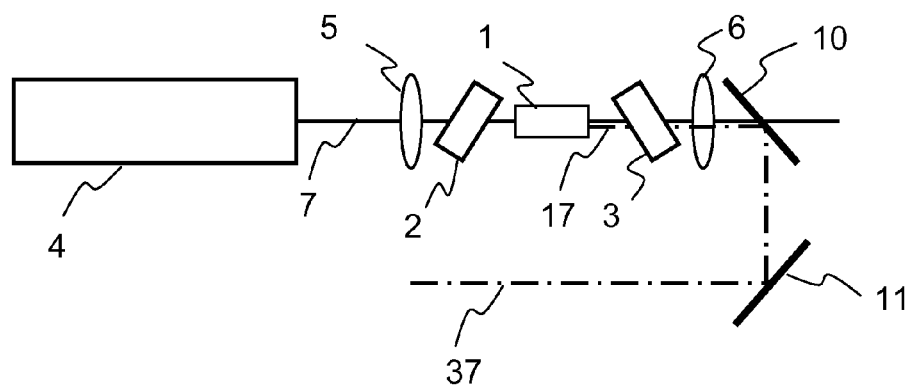
Figure 6:
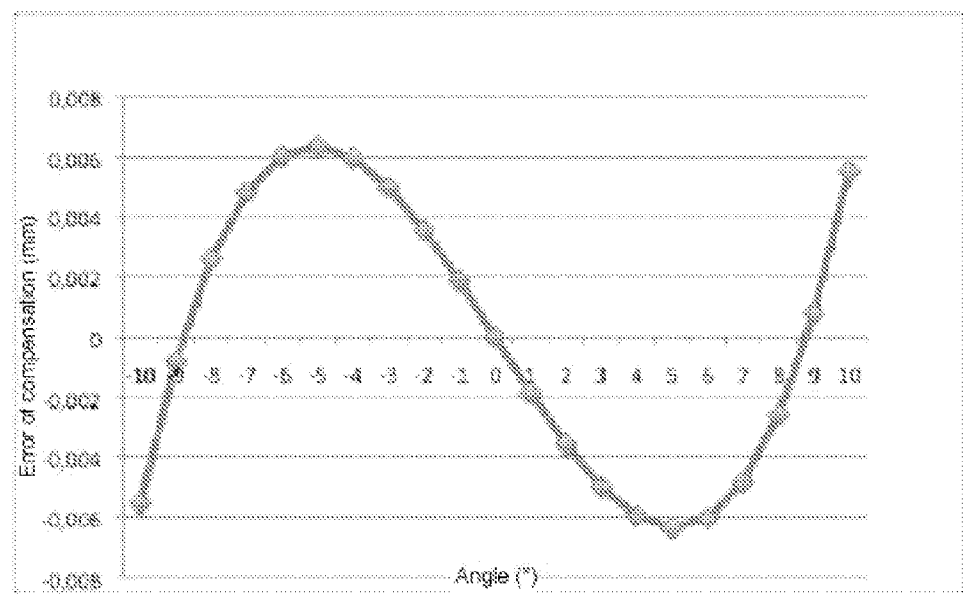
Figure 7:
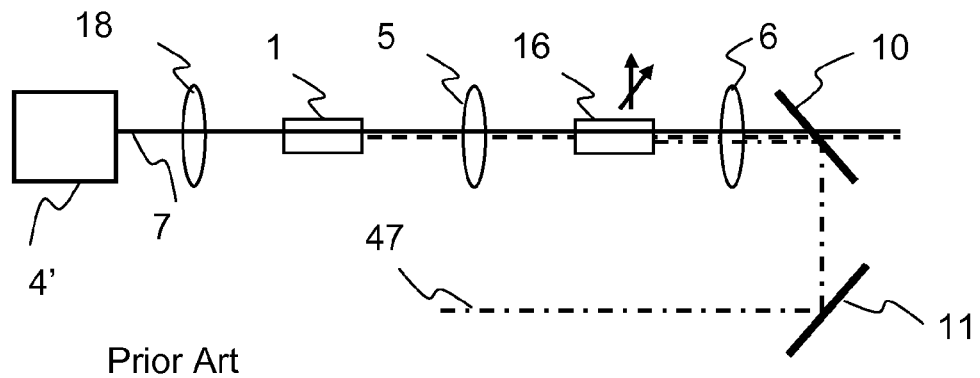
Figure 8:
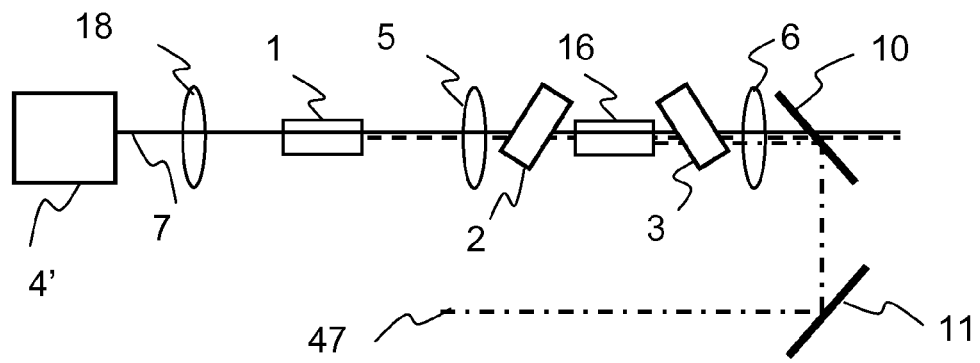
Figure 9:
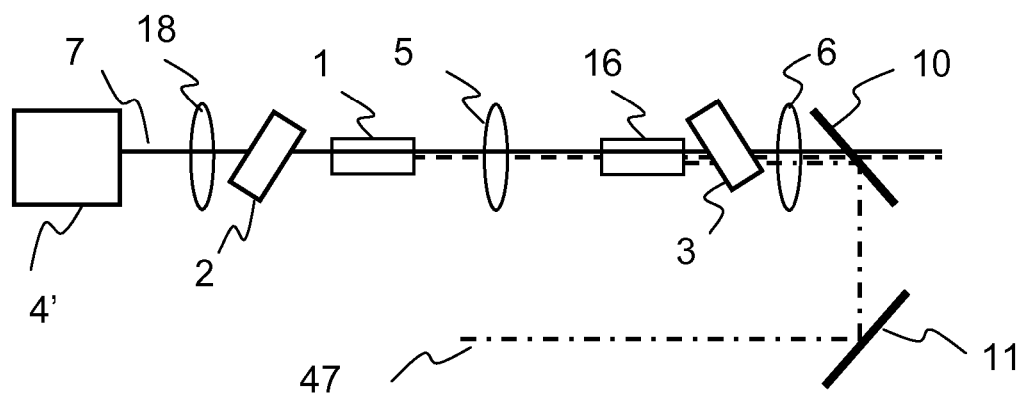
Figure 10:
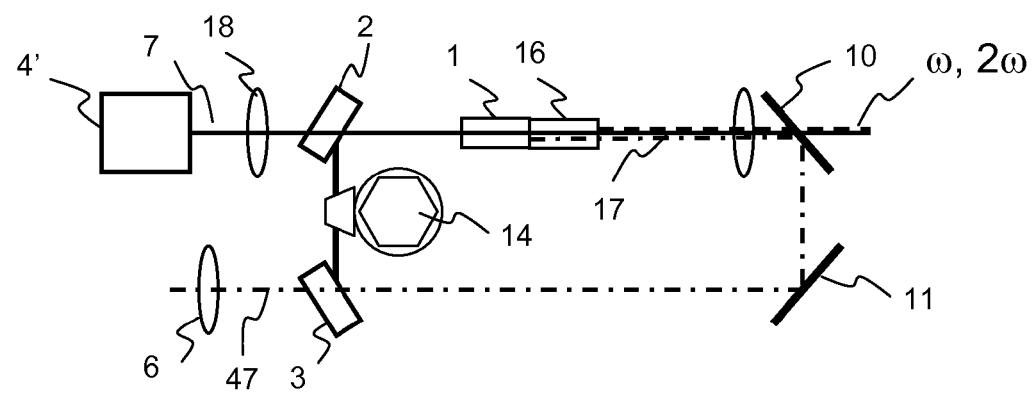
Figure 11:
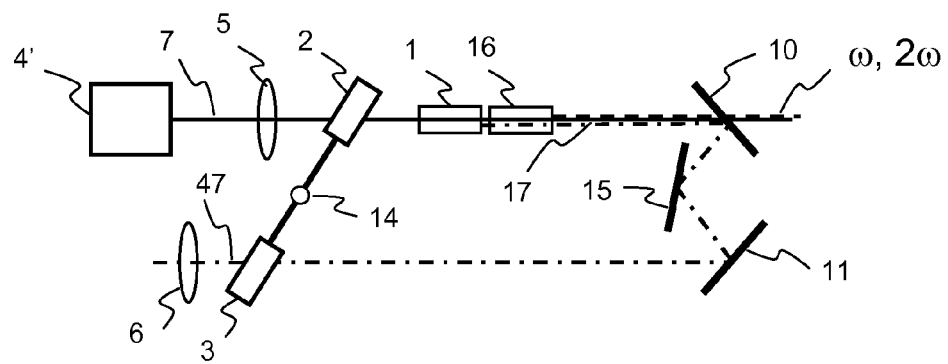
Figure 12:
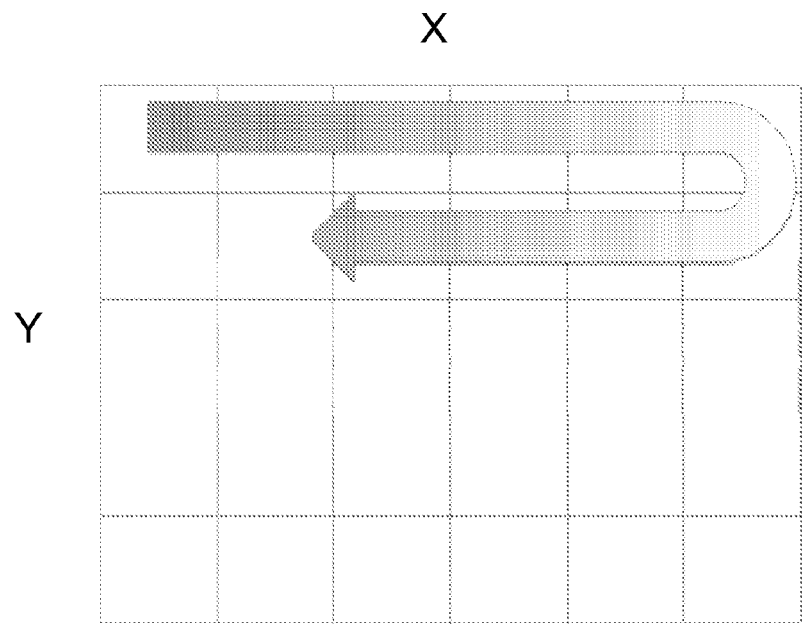

FIG. 3 schematically shows a $2^{nd}$ harmonic generator according to the prior art;

FIG. 4 schematically shows a $2^{nd}$ harmonic generator according to the invention;

FIG. 5A schematically shows the operation of a system with two inclined plates, on either side of a non-linear crystal, according to a first inclination of the two plates, and FIG. 5B according to a second inclination of the two plates;

FIG. 6 shows a curve of measurement of the error of compensation of the output beam as a function of a range of angular inclination $(i_2^0 \pm \delta i_2)$;

FIG. 7 shows a $3^{rd}$ harmonic generator according to the prior art;

FIG. 8 shows a first embodiment of a $3^{rd}$ harmonic generator according to the invention;

FIG. 9 shows a second embodiment of a $3^{rd}$ harmonic generator according to the invention;

FIG. 10 schematically shows a system for controlling the plate orientations in a device of the invention;

FIG. 11 schematically shows a means for mechanically coupling the two plates of a device of the invention;

FIG. 12 shows an example of scanning of the area of illumination by the laser beam using a device of the invention.

Figure 1:
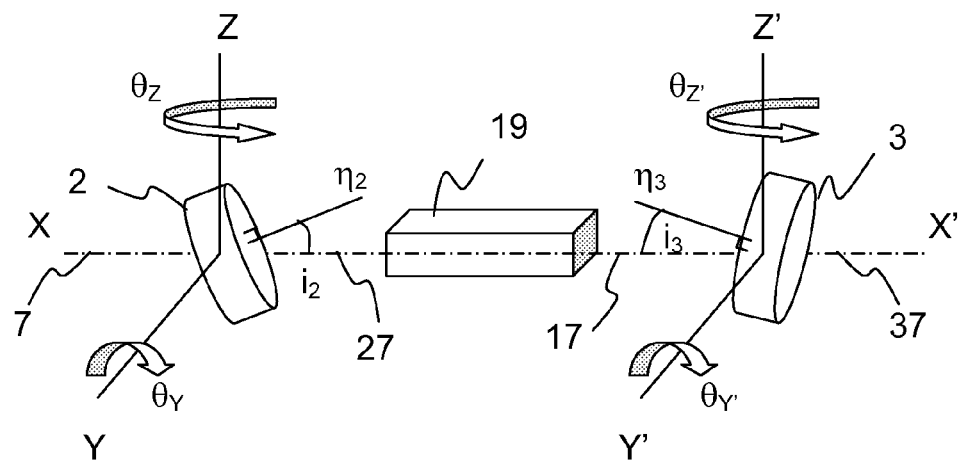
FIG. 1 is a schematic diagram of a device of the invention.

FIG. 1 schematically shows the principle of operation of a device for extending the lifetime of a non-linear optical system according to the invention. A non-linear optical system 19 is located on the axis of propagation of an optical beam 7, for example a laser beam. The non-linear optical system, in the principle example considered, consists of a non-linear optical component 1. The optical component 1 receives an incident optical beam 7 of fundamental optical frequency $\omega_i$ propagating following an axis X and transmits an output optical beam 17 of optical frequency $\omega_2$ propagating according to an axis X'. It is attempted to minimize the deterioration of the optical component 1 subjected to the optical radiation of the laser beam. The device comprises two plates 2 and 3, with flat and parallel surfaces, of respective thickness $e_2$, $e_3$. The two plates are placed in the optical path of the optical beam. The first plate 2 is placed in the path of the incident beam 7 and inclined by an angle $i_2$ relative to the axis X. The angle of inclination $i_2$ is the angle formed between the normal $\eta_2$ to the surface of the plate 2 and the axis of the beam 7. The incident beam 7 passes through the plate 2 and exits as a transmitted beam 27 of optical frequency $\omega_i$. The transmitted beam 27 propagates following an axis parallel to the axis of propagation of the incident beam 7. The second plate 3 is placed in the path of the beam 17 of optical frequency $\omega_2$ at the exit of the optical component 1 and inclined by an angle $i_3$ relative to the axis X'. The angle of inclination $i_3$ is the angle formed between the normal $\eta_3$ to the surface of the plate 3 and the axis of the beam 17. The inclination of each plate 2, respectively 3, can be modified by transverse rotations around the two axes (Y, Z), respectively (Y', Z'), perpendicular to the axis of propagation X, respectively X', of the laser beam. The inclination $i_2$ of the plate 2 varies over an angular range $(i_2^0 \pm \delta i_2)$ through one or two rotations transverse to the axis X. Likewise, the inclination $i_3$ of the plate 3 varies over an angular range $(i_2^0 \pm \delta i_2)$ through one or two rotations transverse to the axis X'. In the exemplary embodiment illustrated in FIG. 6, the amplitude of the angular variations of $i_2$ is of $\pm 10$ deg. The plates 2 and 3 do not axially rotate around the beam axis. The modification of the inclination $i_2$ of the first plate 2 induces a displacement $(d_{Y2}, d_{Z2})$ of the beam 27 transmitted by said plate 2 to the optical component 1. This displacement $(d_{Y2}, d_{Z2})$ permits to modify the area of the optical element that is subjected to the optical radiation of the incident beam. The second plate 3 permits to compensate at best for the lateral shift $(d_{Y2}, d_{Z2})$ of the axis of the beam 17 at the exit of the optical component 1 over a range of inclinations of the plates 2, 3 and to keep fixed the axis of propagation of the laser beam 37 at the exit of the device, by adjusting the respective inclinations of the two plates 2 and 3 and/or by optimizing the thickness of the two plates.

Figure 2:
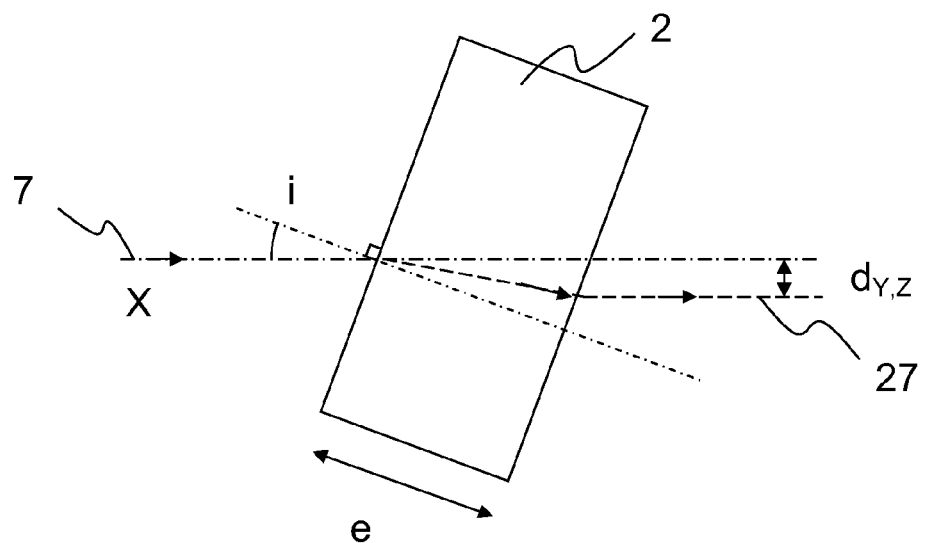
FIG. 2 shows the principle of operation of an inclined plate with flat and parallel surfaces.

FIG. 2 indicates in a more detailed manner the propagation of the laser beam in a plate 2 or 3. For a best explanation, FIG. 2 shows a projection onto a plane comprising the axis X of propagation of the incident beam and the normal $\eta$ to the plate with flat and parallel surfaces. A plate with flat and parallel surfaces, of thickness e, is inserted on the axis of the incident optical beam 7, in front of the optical component 1. The inclination of this plate by an angle i relative to the axis of the beam 7 induces a deflection of the axis of the beam 27 at the exit of the plate, which propagates following an axis shifted by a quantity d. The passing through a plate of thickness e and of index n, whose normal forms an angle i relative to the beam, induces a displacement of the beam by a distance d given by:

$$d = e \sin i \cdot \left[ 1 - \frac{\cos i}{(n^2 - \sin^2 i)^{1/2}} \right] \quad [\text{I}]$$

By adjusting the angle i, it is therefore possible to adjust the distance d. The adjustment of angle i is obtained by the combination of two rotations $\theta_Y$, $\theta_Z$ around two directions (Y, Z) transverse to the axis of propagation X, which permits to deflect the beam at the exit of the plate following two directions $(d_Y, d_Z)$ transverse to the axis of propagation of the beam. It is then possible to modify the area of illumination by the beam on the optical component 1 over a wide area with respect to the size of the beam. The axis of the beam 27 exiting from the plate 2 is, by construction, perfectly parallel to the axis of the input beam 7, whatever the inclination i of the plate. A misadjustment of the plate 2 in translation or in rotation can, by construction, introduce only a translation of the output beam but in no way a variation of the direction thereof.

FIG. 2 shows a deflection of the beam within a plane. When the plate is capable of being oriented around two axes perpendicular to the axis of propagation of the laser beam, the deflection can also take place in another direction perpendicular to the axis of propagation.

In many applications, and in particular in laser micromachining, it is important to extend the lifetime of the optical component, but it is also essential to deliver an output laser beam with stable direction and position.

In certain particular cases, the output beam can be made perfectly collinear with the input beam, by adding a second plate 3 whose thickness and orientation are optimized to compensate for the shift d induced by the first plate 2.

A perfect compensation is obtained when the wavelength of the incident beam and of the beam transmitted by the optical component is the same, by means of two identical plates (same thickness and same material), inclined by opposite angles. The compensation is valid whatever the angle of inclination (symmetrical) of the two plates.

When the input wavelength (or optical frequency $\omega_1$) is different from the output wavelength (or optical frequency $\omega_2$), it is also known how to compensate the displacement of the output beam in the two following particular cases:

- by using two identical plates and by adjusting the inclination of the second plate to compensate for the displacement of the beam induced by the $1^{st}$ plate at the $1^{st}$ wavelength by a opposite displacement induced by the $2^{nd}$ plate at the $2^{nd}$ wavelength, or
- by using plates with symmetrical inclination (fixed) and by calculating the thickness of the plates so that their induced shift at this inclination and at these wavelengths compensate for each other.

These two solutions are not compatible with an axial rotation of the plates that keeps the fixed inclination thereof. The compensation for the output beam shift is then valid only for a defined pair of input and output wavelengths (but not for an OPO where the output wavelength is variable).

A compensation for the beam shift at the exit is far more difficult to obtain when the wavelengths are different and the inclination of the plates is variable. In this case, the output beam has generally not a constant position as a function of a variable inclination. The error of repositioning of the output beam depends both on the angles of inclination of the two plates and on the input and output wavelengths. One object of the invention is to minimize this error of repositioning for a range of angular inclination variations of the plates.

Indeed, the optical index n of a plate varies as a function of the wavelength due to the dispersion. The shift d depends at once on the physical properties of the plate (thickness e, index n), on the inclination i thereof and on the wavelength of the beam that passes through it. The invention uses these different parameters to obtain the best compensation possible between two plates 2 and 3 over a predefined range of transverse rotations of the plates, i.e. over a range of angles of inclination $i_2$, $i_3$.

This optimization depends on the application of the device of the invention, in particular when several wavelengths are involved, as described in detail in the following examples.

The invention may serve for many applications and will be explained in various particular cases, i.e. the production of the second harmonic and the production of the third harmonic of a laser beam.

A conventional implementation of $2^{nd}$ harmonic generation is shown in FIG. 3. A laser source 4 produces a source radiation at a frequency ω generally located in the near infrared. The source 4 comprises a first non-linear crystal (not shown) that converts the source radiation to the frequency 2ω located in the visible. The source 4 thus emits a visible radiation 7 directed toward a focusing optical means 5 that is generally a lens. The optical means 5 may also be a mirror or a set of mirrors and/or of lenses. The lens 5 focuses the beam 7 to a point on the non-linear crystal 1. The non-linear crystal 1 is adapted to the doubling of the frequency of the beam 7 and generates a beam 17 at the frequency 4ω. An optical system comprising a collimating lens 6 and one or more dichroic mirrors 10 and 11 permits to separate the beam 7 at the frequency 2ω from the beam 17 at the frequency 4ω. In a device of the prior art shown in FIG. 3, the crystal 1 is generally mounted on a displacement system that permits to change the point of impact of the beam 7 to the non-linear crystal when the efficiency of the conversion toward the $4^{th}$ harmonic decreases.

According to an embodiment of the invention, shown in FIG. 4, two plates 2 and 3 are inserted between the optical means 5, 6 and the crystal 1. The non-linear crystal 1 remains fixed, and thus requires no displacement system. The plate 2 is interposed between the lens 5 and the crystal 1 and the plate 3 between the crystal 1 and the lens 6. The plates 2 and 3 are capable of being oriented with a variable inclination around the two axes Y, Z perpendicular to the laser beam. Optimally, the plates 2, 3 comprise an antireflection treatment at the wavelengths of use.

Figure 5:
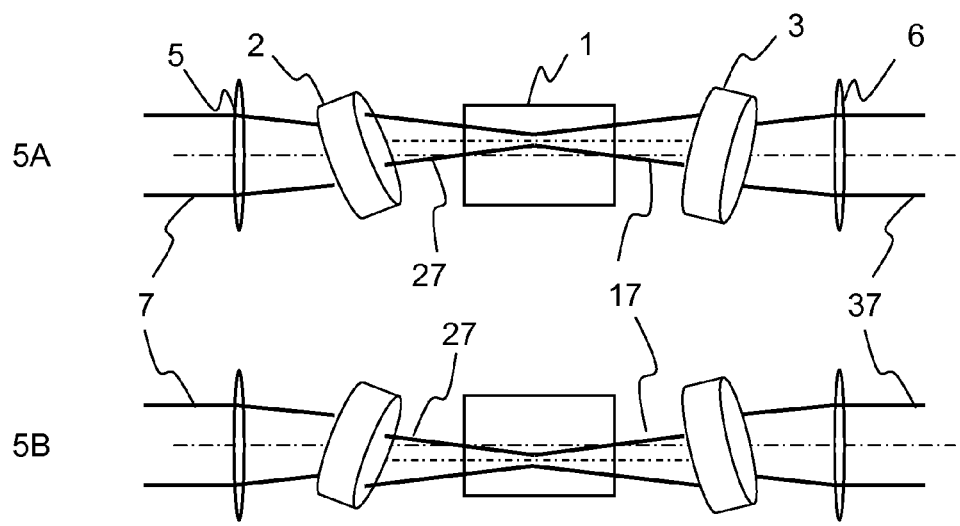

FIG. 5 schematically shows the effect of the beam displacement on the crystal 1 and at the exit of the device produced by a pair of plates 2, 3 inclined to a focused laser beam, for different orientations of the pair of plates, shown respectively in FIGS. 5A and 5B. The plates 2, 3 induce a shift of the optical axes. The first plate 2 used alone permits to obtain the effect of displacement of the point of impact of the transmitted beam 27 on the crystal 1, but the position and the direction of the output beam 37 change with the variation of inclination of this plate 2, which is generally not acceptable. The thickness of the second plate 3 and/or the inclination $i_3$ thereof are optimized to compensate at best for the displacement of the first plate 2 over a range of inclinations of the plates.

In the application to an optical harmonic generator, the beam 17 that is of interest at the exit of the non-linear crystal 1 has not the same wavelength as the incident beam 27 on this crystal 1. It is thus advisable to take that into account in the calculation of orientation of the plates 2 and 3. The formula [I] shows that the shift d depends on the angle of incidence i, but also of the index n that varies with the wavelength. By using fixed angles of inclination, the shift may be compensated for by means of two identical plates (same thickness and same material) oriented with slightly different angles to compensate for the index difference, or orientations of same magnitude but of opposite sign may be used with plates of different physical thicknesses, calculated so that the optical thickness of the plate 2 at the wavelength of the beam 7 corresponds to the optical thickness of the plate 3 at the wavelength of the beam 17. However, this compensation is valid only for constant angles of inclination $i_2$ and $i_3$, and for also fixed input $\omega_1$ and output $\omega_2$ wavelengths.

A more detailed study of the relation [I] shows that, the relation between d, i, e and n being non-linear, a change of the index n cannot be compensated for by a simple change of the thickness e when i varies over a range of angles of inclination. If the plate 2 has a thickness $e_2$ and an index $n_2$, and the plate 3 has an index $n_3$, a thickness $e_3$ of the plate 3 can be found that minimizes the error of shift compensation for a range of angles of incidence and thus a given range of shifts. FIG. 6 shows an example of result of the repositioning error committed using a plate 2 of 26 mm, of index 1.45 at 515 nm, and a plate 3 made of the same material, at 243 nm.

The optimal thickness $e_3$ of the plate 3 that permits to minimize the average error over a rotation range of $i_2$ of ±10° is a thickness of 24.9 mm, relatively far from the physical thickness given to equalize the optical thicknesses (25.64 mm) that correspond to an optimization for a single angle $i_2=i_3=0$.

The optimization can be obtained by different conventional methods of minimization of the error. In particular, the least squares method may be applied, which amounts to minimize the distance between the two curves $d_2(i)$ and $d_3(i)$. Mathematically, it amounts to search for a set of values of $n_3$ and $e_3$ that minimizes the quantity:

$$\int_{i=i_{min}}^{i=i_{max}} (d_2 - d_3) di.$$

However, it may be decided to increase the weight of certain inclinations (for example, those that are close to the axis and that correspond to the centre of the crystal).

In this case, a weight is placed on each value of d, and the formula becomes:

$$\int_{i=i_{min}}^{i=i_{max}} p(i)(d_2 - d_3) di$$

where p(i) is the weight chosen for the inclination i.

This optimization supposes that the angles $i_2$ and $i_3$ are the same. It may be decided to exactly cancel the displacement (i.e. $d_2-d_3=0$) for a particular angle, but it amounts to generally increase the error for the other angles.

It is observed in FIG. 6 that the residual displacement of the beam at the exit of the two-plates compensation device of the invention displaces of only a few micrometres (maximum amplitude of ±6 micrometres), which is acceptable with respect to the size of the beam (about 100 micrometres).

An advantage of this device is that it permits to fasten firmly the non-linear crystals in the laser and that the phase matching of these latter is insensitive to the displacement and the orientation of the plates 2, 3 introducing the shift.

A second particular embodiment of the invention relates to the production of the third harmonic. A convention third harmonic generation device is schematically shown in FIG. 7. A laser source 4' is used to produce a radiation at the frequency ω generally located in the near infrared. The infrared radiation of the laser is focused by optical means 18 to a first non-linear crystal 1 that converts the radiation to the frequency 2ω. This conversion being not complete, the system then emits a beam comprising both a radiation 7 at the frequency w and a radiation 17 at the frequency 2ω. These fused beams 7 at ω and 17 at 2ω are incident on a focusing optical means that is generally a lens 5. The lens 5 focuses the two beams 7, 17 at a single point on a second non-linear crystal 16. The second non-linear crystal 16 is adapted to permit the summing of the frequencies of the beams 7 and 17 to produce a beam 47 at the frequency 3ω. An optical system comprising a focusing lens 6 and one or more dichroic mirrors 10 and 11 permits to separate the beams 7 and 17 at the frequencies ω and 2ω, respectively, from the beam 47 at the frequency 3ω. Optimally, the orientation of the crystal 1 is chosen so that the walk-off direction of the beams 7 and 17 in the crystal 1 is opposed to the walk-off direction of these same beams in the crystal 16.

Optimally, the temperature of the crystals 1 and 16 is stabilized with an accuracy of the order of 0.1° C.

In the prior art devices, the crystal 16 is generally mounted on a displacement system that permits to change the point of impact of the beams 7 and 17 when the efficiency of conversion toward the $3^{rd}$ harmonic decreases, the optical beams 7, 17 and 47 remaining fixed.

According to a preferred embodiment of the invention, shown in FIG. 8, the two plates 2 and 3 are inserted between the optical means 5, 6 and the crystal 16. The plate 2 is interposed between the lens 5 and the crystal 16 and the plate 3 between the crystal 16 and the lens 6. The plates 2, 3 are capable of being oriented with an inclination $i_2$, respectively $i_3$, varying over a range of angular inclinations through transverse rotations around the two axes Y, Z perpendicular to the laser beam. On the opposite, the non-linear crystal 16 remains fixed and requires no displacement system. Optimally, the plates 2, 3 comprise an antireflection treatment at the wavelengths of use. A limitation of the device shown in FIG. 8 comes from the chromatism of the shift introduced by the plate 2. Indeed, the two beams 7 and 47 are not at the same wavelength and will thus undergo very slightly different shifts that may possibly harm the $3^{rd}$ harmonic generation.

According to an embodiment of the device of the invention shown in FIG. 9, the plate 2 is placed in front of the first doubling crystal 1. The direction and amplitude of the movement of the plate 3 has then to take into account the magnification introduced by the lens 5 as well as the wavelength difference between the beams 7 and 47. This control of the variation of inclination of the plate 3 may be carried out by means of an electronic system capable of calculating the orientation of the plate 3 so as to compensate for the displacement induced by the plate 2. The device can be simplified by omitting the lens 5. In this case, the size of the beams in the crystals 1 and 16 is approximately the same.

FIG. 10 shows a topology of the device in a simplified embodiment. An electronic system of control 13 controls the variations of orientation of the plates 2 and 3. According to a first embodiment in which the plates are optically equivalent (same thickness, same material), the control system ensures that the respective orientations $i_2$, $i_3$ of the plates 2, 3 are perfectly identical but opposite to each other. According to an embodiment in which the plates are physically equivalent or in which the plates are not optically equivalent, the control system calculates the correction of orientation of the plate 3 with respect to the orientation of the plate 2, for each inclination $i_2$ of the plate 2.

From the result of FIG. 6, the device can then be designed so that the angular displacements of the plates 2 and 3 are identical (or symmetrical). The electronic system may then be replaced by a mechanical coupling system as shown in FIG. 10. A single motor 14 per axis of rotation permits to control an identical displacement of the two plates.

Finally, an optimized configuration exists, in which a single orientation system can be used to displace the two plates 2, 3. It is important to note that, in all the preceding implementations, the plates had to undergo rotations in opposite directions that complicated the coupling thereof. The same effect of compensation can be obtained with a single orientation control system, provided that an odd number of mirrors is introduced between the two plates. FIG. 11 shows a preferred embodiment with three mirrors 10, 11 and 15. The system then becomes extremely stable and simple. The two plates 2, 3 being integral with each other, an accidental variation of their respective orientation translates only into a displacement of the point of impact in the crystal and affects in no way the direction or the position of the beam 47.

The thickness of the plates 2 and 3 is calculated so as to minimize the error of compensation by taking into account the index difference seen by the radiations 7 and 47, using the relation [I] over the range of variations of the inclination angles of $i_2$ and $i_3$.

In the implementation of FIG. 11, the size of the beams in the crystals 1 and 16 is approximately the same. It can be interesting to have different beam sizes in the two crystals. For that purpose, an optical system having a magnifying power G is introduced between the crystals 1 and 16. In this case, the optical system has to be taken into account in the calculation of the compensation by the plate 3 of the displacement introduced by the plate 2. It is possible either to act on the optical thickness thereof to maintain an identical rotation for the two plates, or to use independent rotations. To use the device of FIG. 11, the sign of the magnification between the crystals 1 and 16 must imperatively be positive. In the case in which there is an optical conjugation between the two crystals and in which it is desired to use the simplified mode of compensation with a single mechanism displacing simultaneously the plates 2 and 3, the number of reflections to be introduced in the optical path between the plate 2 and the plate 3 must always be odd.

The systems shown in relation with FIGS. 7 to 11 correspond to the particular case of the third harmonic generation, but they apply as well at other cases needing a variation over time of the position of the beam on an optical element, such as the fifth harmonic generation, the optical parametric generation, or even the pumping of laser materials in the UV or the production of non-linear effects (Raman, for example). The same device applies also to optical frequency converters, including the Optical Parametric Oscillator (OPO), that permit to fabricate wavelength-tunable light sources (variable $\omega_2$).

In the preceding examples, the rotation amplitude of the plate 2 (i.e. the range of inclinations $i_2^0 \pm \delta i_2$) is calculated so as to introduce a displacement $d_2$ corresponding to about 3 times the diameter of the beam on the crystal. The variations of inclination of the plates are preferentially discontinuous between two periods of use of the device, the beam remaining fixed between two displacements. A transverse rotation of the plates is typically applied every 100 to 500 hours. The formula [I] permits to determine the amplitude of this rotation as a function of the absolute value of the angle of inclination.

Different strategies of scanning movements of the beam on the crystal can be used. For example, the plate may be progressively rotated around a horizontal axis until the beam reaches the edge of the crystal. The plate is then rotated by a small angle according to the vertical axis, and a reverse movement according to the horizontal axis can be resumed. The movement of the beam in a plane transverse to its axis of propagation then follows a scanning trajectory as shown in FIG. 12.

The device of the invention permits to locally displace a laser beam with respect to an optical component according to two independent directions transverse to the beam axis, while maintaining the direction of the transmitted beam parallel to the incident direction and the beam position at the exit of the device fixed. Only the beam inside the device moves this way with respect to a fixed non-linear optical system while ensuring a perfect orientation of the laser beam with respect to the optical system, whatever the position thereof, and ensuring the perfect repositioning (in terms of angle and position) of the laser beam at the exit of the device. The non-linear optical system may be a non-linear crystal, a group of non-linear crystals, a set of non-linear optical components, or any combination comprising the above-mentioned elements.

The invention claimed is:

1. A device for extending the lifetime of at least one frequency-converting non-linear optical crystal subjected to the radiation of an incident laser beam, said at least one frequency-converting non-linear optical crystal being capable of converting the incident laser beam of fundamental optical frequency into an output beam of different optical frequency, the device comprising:
a first transmission plate with flat and parallel surfaces, of first thickness and of first optical index, capable of being inserted in the optical path of said incident laser beam and of transmitting a first beam, the normal $\eta_2$ to a flat surface of said first transmission plate forming a first angle of inclination with an axis of propagation of the incident laser beam,
a second transmission plate with flat and parallel surfaces, of second thickness and of second optical index, capable of being inserted in the optical path of the output beam at the exit of said at least one frequency-converting non-linear crystal and of transmitting the output beam the normal $\eta_3$ to said second transmission plate forming a second angle of inclination with respect to an axis of propagation of the output beam,
a control system for the first transmission plate and the second transmission plate, the control system performing:
(i) transverse rotation of said first transmission plate around at least one axis transverse to the axis of propagation of the incident laser beam, capable of modifying the first angle of inclination over a first angular range to displace the first beam by a first displacement with respect to a first frequency-converting non-linear optical crystal of said at least one frequency-converting non-linear optical crystal, and
(ii) transverse rotation of said second transmission plate around at least one axis transverse to the axis of propagation of the output beam (17), capable of modifying the second angle of inclination over a second angular range,
wherein said first and second transmission plates and said control system are capable of minimizing an amplitude of a second displacement of the output beam, in terms of position and of angular direction, over the first angular range of the first plate,
wherein the control system causes the transverse rotations of the first and second transmission plates at a first time, the control system causes the transverse rotations of the first and second transmission plates at a second time, and in between the first time and the second time, the control system causes the first beam to remain at a fixed position on the first frequency-converting non-linear optical crystal.

2. A device according to claim 1, wherein the control system mechanically couples the first and second transmission plates capable of making the first angle of inclination of the first transmission plate and the second angle of inclination of the second transmission plate interdependent with each other over the first angular range, and in that the second thickness of the second plate is capable of minimizing the amplitude of the second displacement of the output beam as a function of the first thickness of the first plate, of the first optical index, the second optical index, and of the first angular range.

3. A device according to claim 2, wherein the control system comprises a mechanical drive capable of causing the simultaneous inclination of the first and second transmission plates with respective first and second angles of inclination opposite to each other.

4. A device according to claim 2, wherein the control system comprises a mechanical drive capable of causing the simultaneous inclination of the first and second transmission plates with respective first and second angles of inclination equal to each other.

5. A device according to claim 2, characterized in that it comprises a motor coupled to the first and second transmission plates, capable of modifying the first and second angles of inclination of the first and second transmission plates by an identical angle, and in that the incident laser beam and the output beam propagate in a plane between the first and second transmission plates, and the output beam undergoes an odd number of reflections between the first and second transmission plates.

6. A device according to claim 1, characterized in that the diameter of the first beam on the first frequency-converting non-linear optical crystal is lower than the amplitude of the first displacement induced by the first angle of inclination of the first transmission plate over the first range of angular inclination.

7. A device according to claim 1, characterized in that the first and second transmission plates are identical and in that the control system is capable of calculating and applying the second angle of inclination as a function of the first and second thicknesses of the first and second transmission plates, of the first and second optical indexes, and of the first angle of inclination, so as to compensate for the second displacement of the output beam for each first angle of inclination over the first angular range.

8. A device according to claim 1, characterized in that it comprises an optical system with a magnifying power, placed between the two plates, and in that the second angle of inclination, the second thickness and the second optical index of the second transmission plate are determined as a function of the magnifying power of the optical system, so as to compensate for the second displacement of the output beam for each first angle of inclination over the first angular range.

9. A non-linear optical source comprising the at least one frequency-converting non-linear optical crystal, characterized in that it comprises a device according to claim 1, whose first and second transmission plates are arranged on either side of said at least one non-linear optical crystal.

10. A non-linear optical source according to claim 9, characterized in that the at least one frequency-converting non-linear optical crystal comprises first and second non-linear crystals located between the first and second transmission plates, the first non-linear crystal being capable of doubling the fundamental optical frequency of the incident laser beam and the second non-linear crystal being capable of generating the $3^{rd}$ harmonic by summing frequencies of the incident laser beam and a second harmonic thereof.

11. A non-linear optical source according to claim 9, characterized in that the at least one frequency-converting non-linear optical crystal comprises first and second non-linear crystals located between the first and second transmission plates, the first non-linear crystal being capable of doubling the fundamental optical frequency of the incident laser beam and the second non-linear crystal being capable of generating the 4th harmonic by doubling a frequency of a second harmonic thereof.

12. A non-linear optical source according to claim 9, characterized in that the at least one frequency-converting non-linear optical crystal comprises first, second, and third non-linear crystals located between the first and second transmission plates, the first non-linear crystal being capable of doubling the fundamental optical frequency of the incident laser beam, the second non-linear crystal being capable of generating the $3^{rd}$ harmonic by mixing the frequencies of the fundamental optical frequency and the second harmonic thereof, and the third non-linear crystal being capable of generating the $5^{th}$ harmonic by mixing frequencies of the second harmonic and a third harmonic produced by the first and second crystals.

13. A non-linear optical source according to claim 9, characterized in that the at least one frequency-converting non-linear optical crystal comprises at least one crystal located between the first and second transmission plates, capable of producing a coherent radiation by optical parametric generation.

14. A non-linear optical source according to claim 9, wherein the control system measures the transmitted power of the output beam after frequency conversion and a drive system capable of causing the transverse rotations of the first and second transmission plates when the transmitted power decreases by a predefined value.

15. A non-linear optical source according to claim 9, characterized in that the device for extending the lifetime of the at least one frequency-converting non-linear optical crystal placed inside a laser cavity.

16. A device according to claim 3, wherein the control system comprises a motor coupled to the first and second transmission plates, capable of modifying the first and second angles of inclination of the first and second transmission plates by an identical angle, and in that the incident laser beam and the first beam propagate in a plane between the first and second transmission plates, and the first beam undergoes an odd number of reflections between the first and second transmission plates.

17. A device according to claim 4, wherein the control system comprises a motor coupled to the first and second transmission plates, capable of modifying the first and second angles of inclination of the first and second transmission plates by an identical angle, and in that the incident laser beam and the first beam propagate in a plane between the first and second transmission plates, and the first beam undergoes an odd number of reflections between the first and second transmission plates.

* * * * *